United States Patent
Yamaguchi et al.

(10) Patent No.: US 10,088,770 B2
(45) Date of Patent: Oct. 2, 2018

(54) IMAGING DISPLAY SYSTEM AND IMAGING DISPLAY METHOD

(71) Applicant: Japan Display Inc., Minato-ku (JP)

(72) Inventors: Kazunori Yamaguchi, Tokyo (JP);
Fumitaka Gotoh, Tokyo (JP);
Takayuki Nakanishi, Tokyo (JP);
Tsutomu Harada, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/600,825

(22) Filed: May 22, 2017

(65) Prior Publication Data

US 2017/0343921 A1    Nov. 30, 2017

(30) Foreign Application Priority Data

May 24, 2016    (JP) .................................. 2016-103334

(51) Int. Cl.
*G03G 15/043* (2006.01)
*H04N 1/00* (2006.01)

(52) U.S. Cl.
CPC ....... *G03G 15/043* (2013.01); *H04N 1/00408* (2013.01); *H04N 1/00474* (2013.01); *H04N 2201/0094* (2013.01)

(58) Field of Classification Search
CPC ............. G03G 15/043; H04N 1/00474; H04N 1/00408; H04N 2201/0094
See application file for complete search history.

(56) References Cited

U.S. PATENT DOCUMENTS

| | | | | |
|---|---|---|---|---|
| 2002/0113764 A1* | 8/2002 | Yamada | ............... | G09G 3/3413 345/88 |
| 2002/0180721 A1* | 12/2002 | Kimura | ............... | H01L 27/3269 345/211 |
| 2005/0190119 A1* | 9/2005 | Yamazaki | ............... | G09G 3/20 345/59 |
| 2013/0335388 A1* | 12/2013 | Yun | .......................... | G09G 5/02 345/207 |

FOREIGN PATENT DOCUMENTS

JP        2011-211507 A        10/2011

* cited by examiner

*Primary Examiner* — Shaheda Abdin
(74) *Attorney, Agent, or Firm* — Oblon, McClelland, Maier & Neustadt, L.L.P.

(57) ABSTRACT

According to one embodiment, an imaging display system includes an imaging device and a display device, which operate synchronously with each other. The imaging display system includes a control device. The control device is configured to measure light exposure when the imaging device captures an image and determine whether the measured light exposure is insufficient, and control the display device to decrease a refresh rate and the imaging device to prolong an exposure time, when determined that the light exposure is insufficient. The first scanning time for the imaging device to scan the image and the second scanning time required for the display device to scan the display panel are constant.

17 Claims, 6 Drawing Sheets

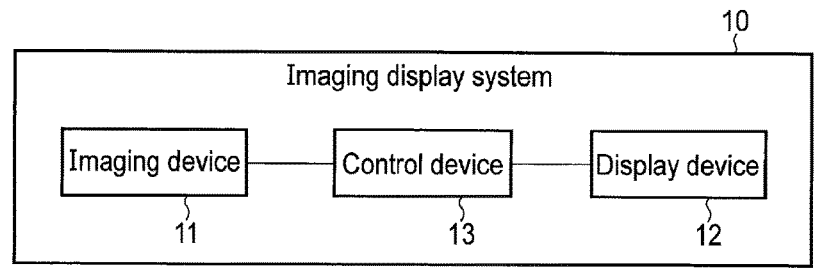
F I G. 1
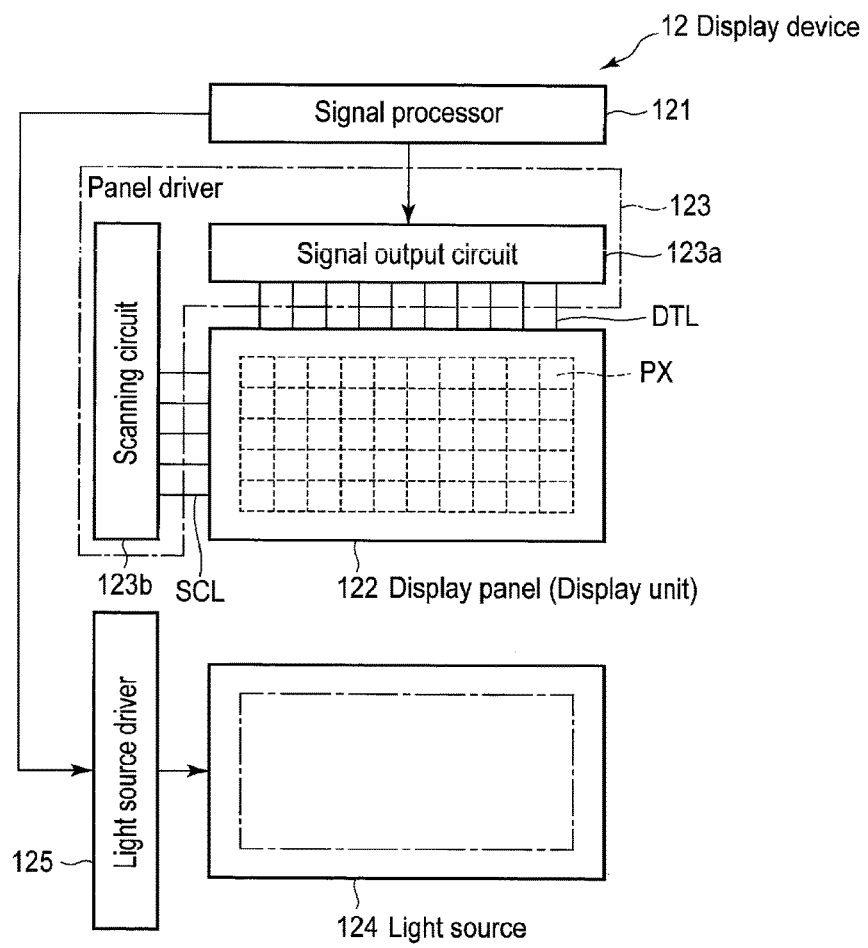
F I G. 2

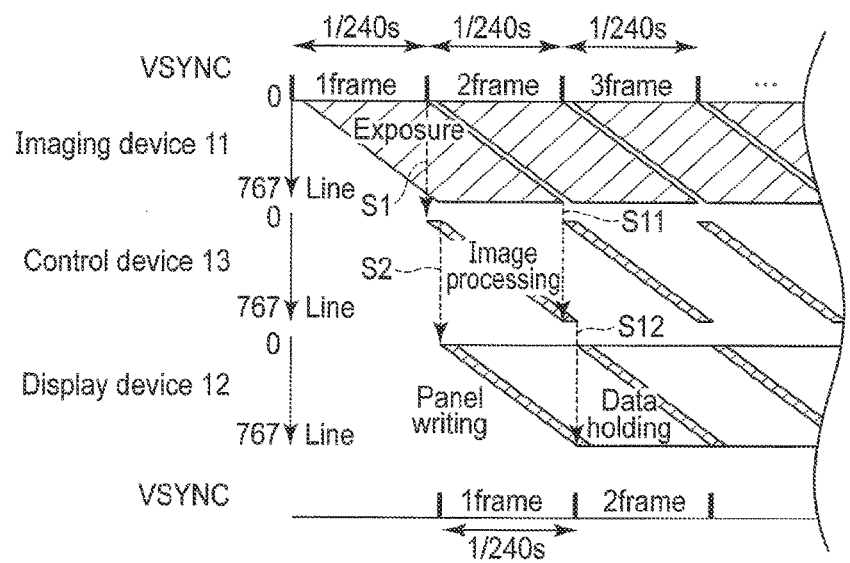
F I G. 3
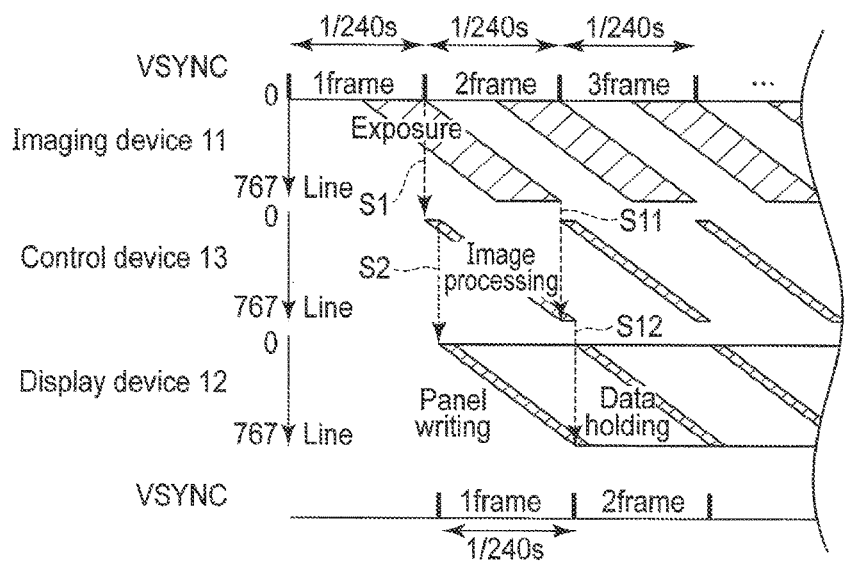
F I G. 4

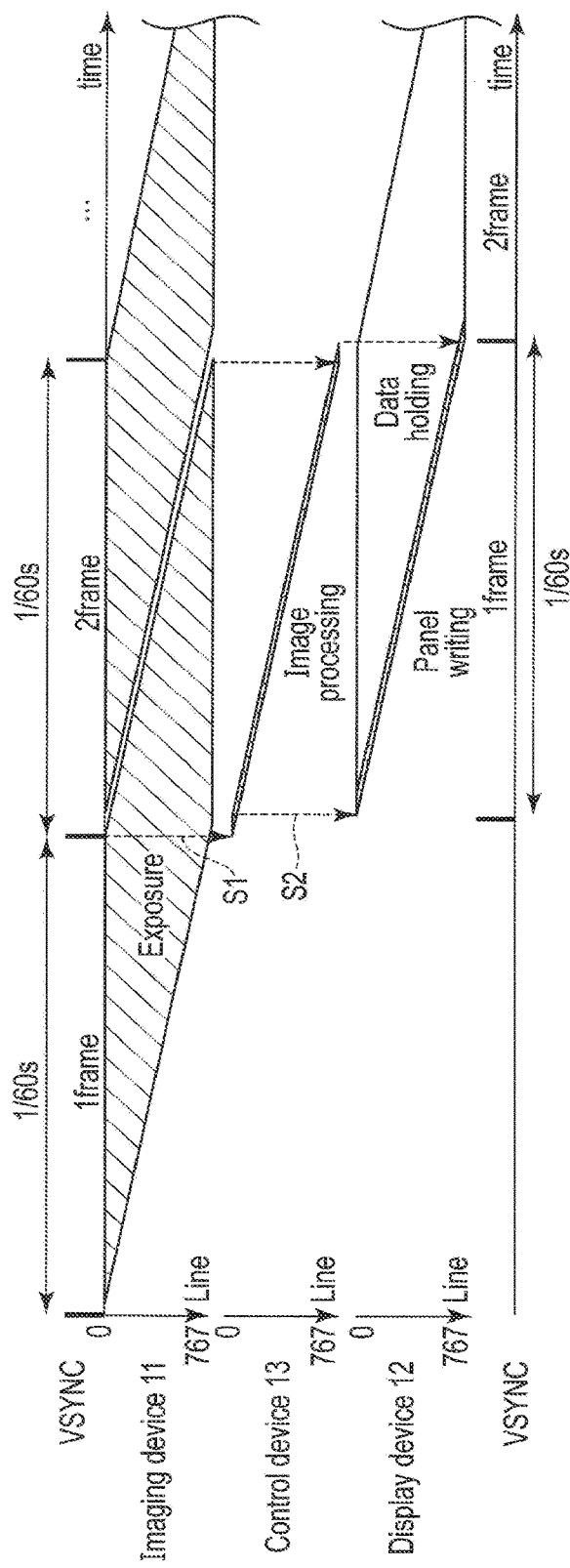
F I G. 5

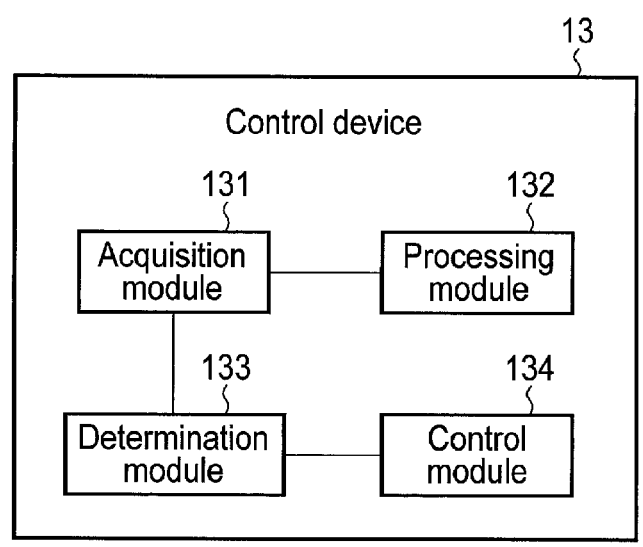
F I G. 7

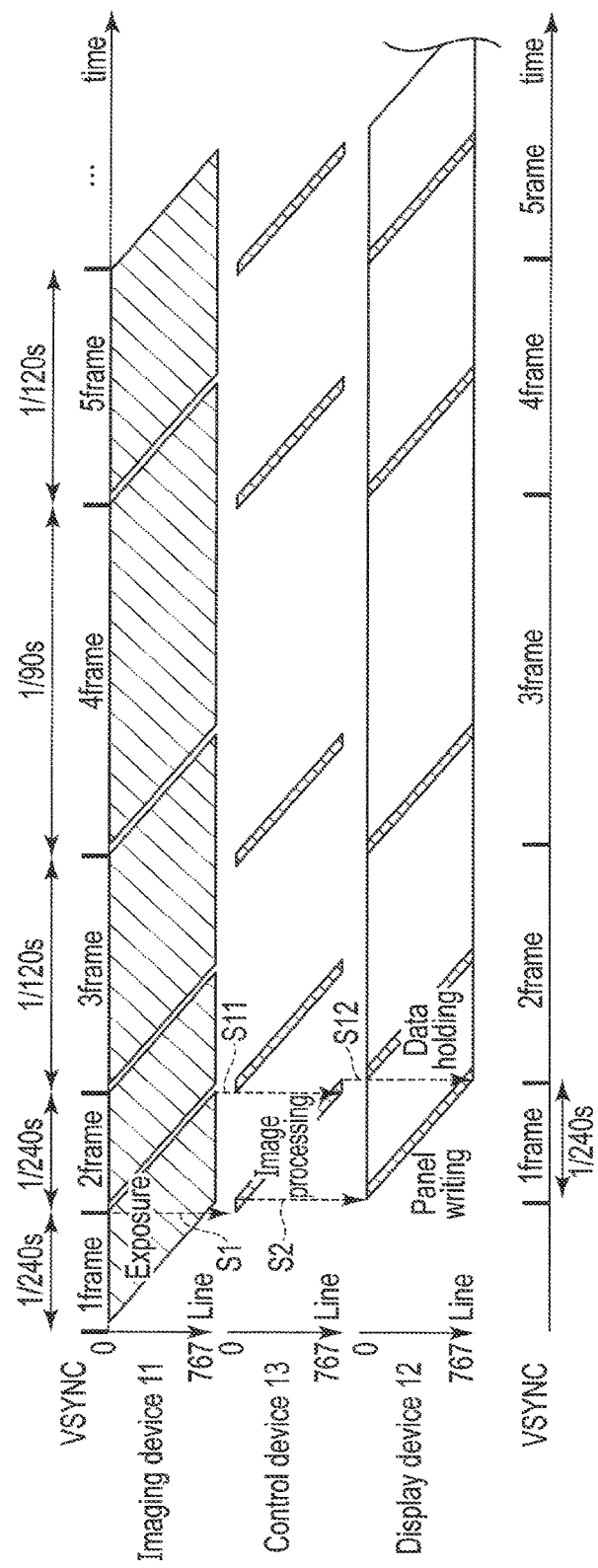
F I G. 8

IMAGING DISPLAY SYSTEM AND IMAGING DISPLAY METHOD

CROSS-REFERENCE TO RELATED APPLICATIONS

This application is based upon and claims the benefit of priority from Japanese Patent Application No. 2016-103334, filed May 24, 2016, the entire contents of which are incorporated herein by reference.

FIELD

Embodiments described herein relate generally to an imaging display system and an imaging display method.

BACKGROUND

Generally, the system in which, for example, an image is captured by an imaging device (image sensor) and is displayed on a display device (which will be referred to as an imaging display system hereinafter) entails the drawback that image quality may vary depending on the light and shade (brightness) of the environment where the image is captured.

However, in the case of a static image to be captured, the image quality can be improved by adjusting the exposure time of the imaging device. In a dark place, for example, the exposure time should be prolonged to secure sufficient quantity of light and thus it is possible to obtain an image with less noise.

On the other hand, in the case of a moving image to be captured, adjustment of exposure time is restricted because of the refresh rate (frame rate). For example, exposure time cannot be made longer than one frame period during which an image of one frame is displayed.

Therefore, in the case of a dark place, it can be considered that exposure time should be prolonged by lowering the refresh rate (prolonging the period of one frame), thereby securing sufficient quantity of light (exposure time).

In this case, however, the time required for the imaging device to scan one frame image (hereafter also referred to as scanning time) for generating image signals for the one frame image must also be changed, which may impose a heavy load on the imaging display system.

BRIEF DESCRIPTION OF THE DRAWINGS

FIG. 1 is a block diagram illustrating an example of a structure of an imaging display system according to one embodiment.

FIG. 2 is a block diagram illustrating an example of a structure of a display device.

FIG. 3 is a timing chart illustrating an example of an operation of the imaging display system.

FIG. 4 is a timing chart illustrating an example of an operation of the imaging display system in the case where exposure time of the imaging device is shortened to reduce light exposure.

FIG. 5 is a timing chart illustrating an example of an operation of a low-delay system in the case where the refresh rate is low.

FIG. 7 is a block diagram illustrating an example of the functional structure of a control device.

FIG. 8 is a timing chart illustrating an example of an operation of the imaging display system in the case where light exposure is adjusted according to change of the environment where an image is captured.

DETAILED DESCRIPTION

Figure 6:
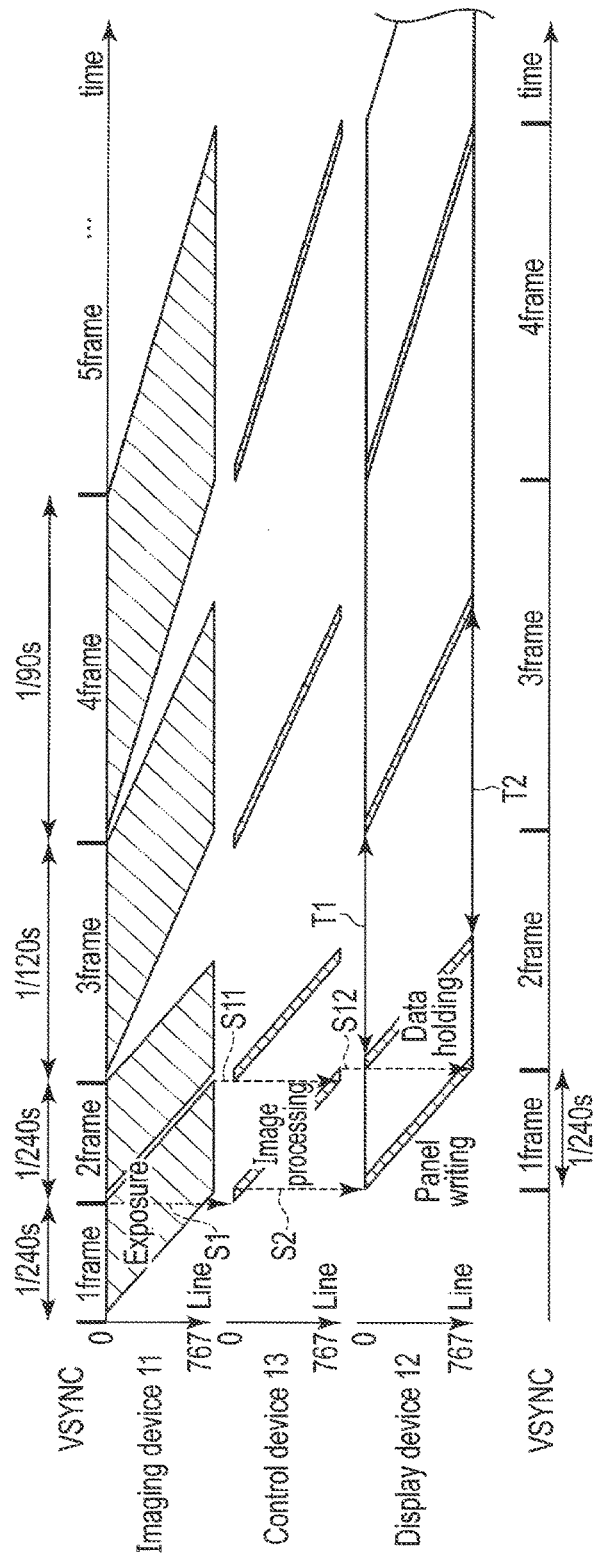
FIG. 6 is a timing chart illustrating an example of an operation of the low-delay system in the case where the exposure time is adjusted according to change of the environment where an image is captured.

Embodiments will be described hereinafter with reference to the accompanying drawings.

In general, according to one embodiment, an imaging display system in which an imaging device which scans an image and generates an image signal indicative of the image and a display device which scans a display panel according to the generated image signal and displays the image on the display panel, operate synchronously with each other is provided. The imaging display system includes a control device connected to the imaging device and the display device. The control device is configured to: measure light exposure when the imaging device captures the image and determine whether the measured light exposure is insufficient; and control the display device to decrease a refresh rate and control the imaging device to prolong an exposure time according to the refresh rate, when determined that the light exposure is insufficient. A first scanning time required for the imaging device to scan the image and a second scanning time required for the display device to scan the display panel are each constant regardless of the refresh rate and the exposure time.

FIG. 1 is a block diagram illustrating an exemplary structure of an imaging display system according to the present embodiment. As illustrated in FIG. 1, an imaging display system 10 includes an imaging device 11, a display device 12, and a control device 13.

The imaging device 11 includes an image sensor (an imager), such as a CCD image sensor or a CMOS image sensor, and captures (picks up) an image of a zone in front of the imaging device 11, for example. The imaging device 11 has two dimensionally arranged imaging elements, such as CCD's or CMOS's. Each imaging element stores an electric signal indicative of a quantity of light irradiated thereon by exposure. An image captured by the imaging device 11 includes electric signals stored in the respective imaging elements. Specifically, the imaging device 11 scans the image captured to generate an image signal indicating the captured image.

The display device 12 is a liquid crystal display which includes a display panel, for example, and scans the display panel according to the image signals generated by the imaging device 11 and displays the image on the display panel.

The control device 13 is connected to the imaging device 11 and the display device 12. The control device 13 includes a processor for controlling the operation of the imaging display system 10 (the imaging device 11 and the display device 12), etc. With the control of the control device 13, the imaging display system 10 can display an image captured by the imaging device 11 on the display device 12.

It should be noted that the imaging display system 10 further has a storage device, which is not illustrated in FIG. 1, for storing a program required for the imaging display system 10 to execute its various processes, or image data captured by the imaging device 11, or other data.

FIG. 2 is a block diagram illustrating an exemplary structure of the display device 12 illustrated in FIG. 1. As illustrated in FIG. 2, the display device 12 includes a signal processor 121, a display panel 122, a panel driver 123, a light source 124, and a light source driver 125.

The signal processor 121 is an operation processor which controls the operation of each of the display panel 122 and the light source 124. The signal processor 121 is connected with a panel driver 123 for driving the display panel 122 and the light source driver 125 for driving the light source 124.

It should be noted here that the image signals generated by the imaging device 11 include a pixel data matrix called a Bayer array, for example. Such image signals are converted into image signals including RGB components when image processing (Bayer conversion) is executed. This image processing may be executed by the control device 13, for example.

The signal processor 121 receives those image signals that have been subjected to the above-described image processing. The signal processor 121 carries out necessary processing to the received image signals and outputs them to the panel driver 123 (the display panel 122).

Moreover, the signal processor 121 generates a light-source-control signal based on the received image signals, and outputs the light-source-control signal to the light source driver 125.

The display panel 122 includes a plurality of pixels PX which are two-dimensionally (matrically) arranged to form a matrix.

The panel driver 123 includes a signal output circuit 123a and a scanning circuit 123b. The signal output circuit 123a is electrically connected with the display panel 122 by signal lines DTL. The signal output circuit 123a holds the image signals output from the signal processor 121, and sequentially outputs the image signals to the display panel 122.

The scanning circuit 123b is electrically connected with the display panel 122 by scanning lines SCL. The scanning circuit 123b executes ON-OFF control of the switching elements to select pixels in the display panel 122.

The light source 124 is placed at, for example, a back surface of the display panel 122. The light source 124 emits light towards the display panel 122.

Based on the light-source-control signal output from, for example, the signal processor 121, the light source driver 125 adjusts a current which is supplied to the light source 124 or a duty ratio. Thereby, the light source driver 125 controls the quantity (strength) of the light applied to the display panel 122.

In the display device 12, image signals (pixel signals) output from the signal processor 121 are sequentially written to those pixels PX (display line) arranged on each row on the display panel 122, to which the light from the light source device 124 is applied, according to the operation of the panel driver 123 (the signal output circuit 123a and the scanning circuit 123b) and the light source driver 125. In this way, the image captured by the imaging device 11 is displayed on the display device 12.

Now, a case where the imaging device 11 captures a moving image, and the display device 12 operates at a refresh rate of 60 Hz (namely, a case where the refresh rate is 60 Hz) will be briefly explained.

When the display device 12 operates at a refresh rate of 60 Hz as described above, images captured by the imaging device 11 are rewritten for each one frame period (a period during which one image is displayed), i.e., for every 1/60 seconds (about 1.7 msec), and thus the moving image is displayed on the display device 12 (display panel 122).

Specifically, the imaging device 11 generates image signals at intervals of 1/60 seconds equivalent to one frame period, and stores the generated image signals in a frame buffer in the imaging device 11. The control device 13 acquires the image signals stored in the frame buffer in the imaging device 11, and processes the acquired image signals into a displayable format. The control device 13 stores those image signals that have been subjected to the image processing in a frame buffer of the control device 13. The display device 12 acquires the image signals stored in the frame buffer in the control device 13, and executes a process (a display process) for displaying the image on the display panel 122 based on the image signals.

As described above, the imaging device 11, the control device 13, and the display device 12 operate to process image signals in units of image of one frame. Therefore, delay of time occurs in the display device 12 to display an image captured by the imaging device 11.

In recent years, there is a demand for an image captured by the imaging device 11 to be displayed on the display device 12 (the display panel 122) in a much lower delay state (namely, as low-delayed as possible).

In the present embodiment, the imaging display system 10 operates as a low-delay system. The imaging display system 10 which operates as a low-delay system drives the display device 12 at a refresh rate of 240 Hz and controls the imaging device 11 and the display device 12 to drive (operate) in synchronization with each other.

In the above-mentioned imaging display system 10, image signals of one frame image are generated by the imaging device 11 at intervals of 1/240 seconds (about 4 msec). Specifically, each time an image signal is generated for one of those lines of one frame image, the image signal for that one line is output from the imaging device 11. In this way, the image signals for each line output from the imaging device 11 are not stored in a frame buffer etc., but are processed one by one by the control device 13 and the display device 12 (image processing and display processing).

Accordingly, the imaging display system 10 which operates as a low-delay system can reduce occurrence of delay only by removing a frame buffer and driving the imaging device 11 and the display device 12 in synchronization with each other to execute the image processing and display processing for each line.

Now, the operation of the imaging display system 10 (low-delay system) will be explained with reference to a timing chart illustrated in FIG. 3.

In the example illustrated in FIG. 3, the display device 12 drives at a refresh rate of 240 Hz, and the imaging device 11 includes imaging elements arranged to form 767 lines.

In this case, the imaging device (image sensor) 11 starts capturing one frame images according to a vertical synchronizing signal (VSYNC), those imaging elements that are assigned for each of 767 lines are sequentially exposed for an exposure time shorter than at least one frame period (1/240 seconds). When the exposure of imaging elements assigned to a line (hereafter simply referred to as imaging elements for one line) is finished, the imaging device 11 generates an image signal for the line based on the electric signals stored in the respective imaging elements assigned to the line. The image signal for one line thus generated is output to the control device 13 (Step S1).

In Step S1, an image signal for one line is output from the imaging device 11. The image signal is subjected to image processing in the control device 13. The image signal having been subjected to the image processing (an image signal for one line) is output to the display device 12 (Step S2).

In this case, the display device 12 executes a display process (a process of writing an image signal in the display panel 122) based on the image signal output from the control device 13 in Step S2. The display device 12 holds the display of an image for 1/240 seconds (namely, one frame period).

A total of 767 lines are successively subjected to such a process. Thus, the imaging display system 10 can display an image of one frame for one frame period (1/240 seconds) which starts according to the vertical synchronizing signal (VSYNC) in the display device 12.

Each of S1 and S2 in FIG. 3 indicates an output image signal for a first one (or a first line) of the lines of a first frame image which is a constituent of a moving image captured by the imaging device 11. On the other hand, each of S11 and S12 indicates an output image signal for the last one line (the 767th line) of the first frame image.

Only the first frame image (or to the process thereof) is discussed above, but the second frame image and later may be similarly processed. It should be noted that, in each of those drawings that follow FIG. 3 and are similar to FIG. 3, each of S1 and S2 indicates an output image signal for a first line of a first frame image, and each of S11 and S12 indicates an output image signal for the last one line of the first frame image.

In the example illustrated in FIG. 3, the imaging device 11 and the display device 12 drive in synchronization with each other so that the imaging device 11 executes its exposure at every 1/240 seconds and the display device 12 displays images using image signals successively generated by the exposure, thereby making it possible to drive the display device 12 at a refresh rate of 240 Hz (240 fps).

If an image (a moving image) is captured by the imaging device 11 at an unsuitable light exposure, the quality of the image displayed on the display device 12 may be deteriorated.

Specifically, if the imaging display system 10 (the imaging device 11) is used in a very bright place (bright place), and if an image is captured by the imaging device 11 at the same exposure time as the case illustrated in FIG. 3, then the light exposure is excessive, and thus the quality of the image displayed on the display device 12 may be deteriorated.

In this case, as illustrated in FIG. 4, exposure time of the imaging device 11 is shortened, thereby reducing the light exposure. Then deterioration in the quality of the image displayed on the display device 12 can be suppressed (that is, image quality can be improved).

Except for reducing exposure time in the imaging device 11, all the operations are already explained with reference to FIG. 3. Therefore, detailed explanation of the embodiment illustrated in FIG. 4 will be omitted.

On the other hand, if the imaging display system 10 is used at a comparatively dark place (a dark place), and if the imaging device 11 captures an image at the same exposure time as the case illustrated in FIG. 3, the light exposure is considered to be insufficient, and the quality of the image displayed on the display device 12 may be deteriorated.

In this case, the exposure time during which the imaging device 11 captures an image is prolonged to increase the light exposure. Thus, the deterioration in the quality of the image displayed on the display device 12 can be suppressed.

Incidentally, in the case where the imaging device 11 captures a moving image and the display device 12 displays it in the imaging display system 10 (a low-delay system), it is required that images each forming one frame should be sequentially displayed (that is, renewed) for every one frame period. Therefore, the exposure time during which the imaging device 11 captures the image cannot be made longer than one frame period (for example, 1/240 second). In other words, the exposure time is limited within one frame period, and thus the exposure time cannot be set to be longer than one frame period.

Therefore, in order to make the exposure time longer than one frame period, it is necessary to lower the refresh rate (frame rate) (namely, one frame period should be prolonged).

In the following explanation, an imaging display system which is presented as a comparative example in comparison with the imaging display system 10 of the present embodiment is merely called a low-delay system. It should be noted that the low-delay system presented as the comparative example will be explained as including the imaging device 11, the display device 12, and the control device 13 in the same way as the embodiment illustrated in FIG. 1.

Now, the operation of the low-delay system (a comparative example) when the refresh rate is lowered to prolong the exposure time will be explained with reference to the timing chart illustrated in FIG. 5. Here, let us assume that the refresh rate is 60 Hz, for example, and that the imaging device 11 and the display device 12 operate synchronously.

If the refresh rate is 60 Hz as illustrated in FIG. 5, the exposure time can be made longer than the case illustrated in FIG. 3. Accordingly, even if the imaging display system 10 is used in a comparatively dark place, a sufficient amount of light exposure can be secured to suppress the deterioration in the quality of the image displayed on the display device 12.

However, in the example illustrated in FIG. 5, the scanning time required for the imaging device 11 to scan the image of one frame (hereafter referred to as the scanning time of the imaging device 11) and the scanning time required for the display device 12 to scan the display panel 122 (hereafter referred to as the scanning time of the display device 12) are prolonged as compared with those of the example illustrated in FIG. 3 or FIG. 4.

In the present embodiment, the scanning time of the imaging device 11 does not mean a time (an exposure time) required for each of the imaging elements assigned to one line to store a quantity of light (equivalent to an electric signal), but means a time required for the imaging device 11 to scan, as in the case illustrated in, for example, FIG. 3 to FIG. 5, an image of one frame from its first line to its last line (namely, a time required to scan all the lines of one frame image). More specifically, the scanning time required for the imaging device 11 illustrated in FIG. 3 or FIG. 4 is, as illustrated in FIG. 3 or FIG. 4, a time spanning from S1 (a point in time when the first line is scanned and the image signal is output) to S11 (a point in time when the last line is scanned and the image signal is output), which is approximately 1/240s. On the other hand, the scanning time required for the imaging device 11 illustrated in FIG. 5 is a time spanning from S1 to S11, as illustrated in FIG. 5, which is approximately 1/60s.

Similarly, it is assumed that the scanning time of the display device 12 is a time required for the display device 12 to scan the display panel 122 in order to write an image in the display panel 122 from the first line of the image till the last line of the image, as illustrated in FIG. 3-FIG. 5. As mentioned above, the imaging device 11 and the display device 12 are synchronously driven in a low-delay system. Therefore, the scanning times of the imaging device 11 and the display device 12 are, for example, the same.

Now, let us assume a case where a low-delay system is used to capture images in a place where the environment (light and darkness) is comparatively changeable, such as the outdoors. In this case, it is preferable to adjust the exposure time (the amount of light exposure) according to change of the environment where an image is captured.

Hereafter, the operation of the low-delay system (a comparative example) at the event of adjusting the exposure time according to change of the environment where an image is captured will be explained with reference to a timing chart illustrated in FIG. 6.

Let us assume that the display device 12 in a low-delay system operates at a refresh rate of 240 Hz, as illustrated in FIG. 6, when displaying an image of a first frame and an image of a second frame, which constitutes a moving image captured by the imaging device 11.

If the environment where an image is captured changes from a bright state to a dark state, for example, then the low-delay system reduces the refresh rate to prolong the exposure time of the imaging device 11. Here, the refresh rate for displaying the third frame image is reduced from 240 Hz to 120 Hz.

This makes it possible to prolong the exposure time compared with a case where the refresh rate is 240 Hz. Thus, a proper amount of light exposure, which does not deteriorate the quality of the image, can be secured even in a dark place.

If the environment where an image is captured becomes even darker, the refresh rate for displaying the fourth frame image is further reduced from 120 Hz to 90 Hz to further prolong the exposure time of the imaging device 11. This makes it possible to further secure a proper amount of light exposure.

However, in the low-delay system illustrated in FIG. 6, each time the refresh rate (exposure time) is changed, the scanning time of the imaging device 11 and the scanning time of the display device 12 are also changed. As a result, the system becomes not only complicated but also the load on the system is heavier.

Let us furthermore assume a case where the environment to capture an image becomes bright and the refresh rate for displaying the fifth frame image becomes high (for example, the refresh rate is returned to 240 Hz).

In this case, the scanning time during which the imaging device 11 captures an image for the fourth frame is long because its refresh rate is 90 Hz, and thus the output timing of the image signal of each line is slow. Therefore, even if there is a need to increase the refresh rate for displaying an image of the fifth frame, the refresh rate cannot be immediately changed from low to high due to the process of capturing an image of the fourth frame (and generating an image signal) (that is, the imaging device 11 cannot be suddenly changed to operate in a scanning time suitable for a high refresh rate). In other words, the low-delay system which operates as illustrated in FIG. 6 cannot increase the refresh rate (return to high) while standing by until generation (output) of the image signal of the image of the fourth frame is completed, for example.

Moreover, if the refresh rate for displaying the third frame image is reduced from 240 Hz to 120 Hz, for example, there is created a large difference between time T1 which begins when an image signal for a first line of a second frame image is written and ends when an image signal for a first line of a third frame image is written and time T2 which begins when an image signal for the last line of the second frame image is written and ends when an image signal for the last line of the third frame image is written.

As described, the difference in the time to hold an image signal (data retention time) between an upper portion and a lower portion of the display panel 122, may cause deterioration in image quality when, for example, adversely affected by leakage current (or more specifically an image displayed on the display panel 122 may vary in color from the upper portion to the lower portion of the display panel 122. The same applies to a case where the refresh rate for displaying an image of the fourth frame is made even lower.

In contrast, the imaging display system 10 of the present embodiment can change the refresh rate to adjust the exposure time (amount of light exposure) without enlarging a system load, and can suppress deterioration of image quality as well.

Now, the functional structure of the control device 13 provided in the imaging display system 10 of the present embodiment will be explained with reference to FIG. 7.

As illustrated in FIG. 7, the control device 13 includes an acquisition module 131, a processing module 132, a determination module 133, and a control module 134. In the present embodiment, each of the acquisition module 131, the processing module 132, the determination module 133, and the control module 134 may be implemented by making a processor provided in the control device 13 execute a predetermined program (that is, by software), or by a piece of hardware, including an IC, or a combination of software and hardware.

The acquisition module 131 acquires an image signal which is indicative of one frame image and is output from the above-mentioned imaging device 11. Specifically, the acquisition module 131 sequentially acquires image signals for every line of one frame image.

The processing module 132 executes image processing to all the image signals for every line, acquired by the acquisition module 131 to convert each of the image signals into an image signal including RGB components (namely, signal displayable by the display device 12). The image signals subjected to the image processing by the processing module 132 are output to the display device 12, and are written in the display panel 122 (pixels PX) of the display device 12.

The determination module 133 measures light exposure when the imaging device 11 captures an image, for example, and determines whether the exposure is lower than a predetermined value (whether the amount of light exposure is insufficient).

Furthermore, based on the brightness value (luminance signal) etc. of the image extracted from the image signal acquired by the acquisition module 131 (or the image signal processed by the processing module 132), for example, the determination module 133 executes its determining process. If the imaging display system 10 includes an illuminance sensor which measures the illuminance around the imaging device 11, the determination module 133 may perform its determining process based on the illuminance measured by the illuminance sensor.

Such a structure makes it possible for the determination module 133 to determine that the light exposure is insufficient for the imaging device 11 to capture an image when the brightness value or illuminance is below a predetermined value.

If the determination module 133 determines that the light exposure is insufficient, the control module 134 controls both the display device 12 and the imaging device 11 to lower the refresh rate and prolong the exposure time according to the lowered refresh rate. By the control executed by the control module 134 (that is, prolongation of exposure time), it is possible to obtain a sufficient amount of light exposure for the imaging device 11 to capture an image.

As described above, reduction in refresh rate in the low-delay system illustrated in FIG. 5 prolongs the scanning time of the imaging device 11 (scanning time required for the imaging device 11 to scan an image of one frame) and the scanning time of the display device 12 (scanning time required for the display device 12 to display an image). In contrast, the imaging display system 10 of the present embodiment is constructed in such a manner that the scanning time of the imaging device 11 and the scanning time of the display device 12 are constant (maintained) irrespective of refresh rate or exposure time.

Hereafter, the operation of the imaging display system 10 at the event of adjusting exposure time according to change of the environment where an image is captured will be explained with reference to a timing chart illustrated in FIG. 8.

Let us assume that the display device 12 in the imaging display system 10 operates at a refresh rate of 240 Hz when displaying an image of a first frame and an image of a second frame of a moving image captured by the imaging device 11.

Let us assume here that the determination module 133 determines that the light exposure is insufficient. In this case, the control module 134 controls the display device 12 to operate at a refresh rate of 120 Hz (a lower refresh rate) to display a third frame image, and also the imaging device 11 to prolong the exposure time of the imaging device 11 according to the lowered refresh rate.

Thus, the exposure time for the imaging device 11 to capture the image of the third frame is prolonged, and the period of displaying the image of the third frame (one frame period) by the display device 12 is changed from $\frac{1}{240}$s to $\frac{1}{90}$s.

In contrast, the scanning time required for the imaging device 11 and the display device 12 to display a third frame image (a refresh rate of 120 Hz) is not longer but constant (for example, about $\frac{1}{240}$s) in comparison with the case of displaying the first frame image or the second frame image (a refresh rate of 240 Hz). In this case, the time required for image processing executed by the control device 13 (processing module 132) to the image signals of all the lines of one frame image (henceforth image processing time) is constant regardless of the refresh rate or exposure time.

Even if the refresh rate for displaying the image of the fourth frame is further reduced (from 120 Hz to 90 Hz), the scanning time of the imaging device 11, the scanning time of the display device 12, and image processing time are constant as illustrated in FIG. 8.

Now, let us consider a case where the display device 12 is operating at a refresh rate of 90 Hz to display a fourth frame image, the refresh rate to display a fifth frame image is changed (increased) to 120 Hz.

In the low-delay system explained above with reference to FIG. 6, it is difficult (complicated) to change the refresh rate so. However, it is easy for the present embodiment to increase the refresh rate (change from low to high) because the scanning times of the imaging device 11 and the display device 12 are constant.

Let us assume that the determination module 133 is configured to determine not only whether the light exposure is insufficient or not but also whether the light exposure is excessive or not. With this configuration, the control module 134 can control the display device 12 to increase the refresh rate and also the imaging device 11 to shorten its exposure time according to the high refresh rate, when the determination module 133 determines that the light exposure is excessive (the light exposure is higher than a predetermined value).

Even if the refresh rate is made high in this way, the scanning time of the imaging device 11 and the scanning time (and image processing time) of the display device 12 are constant as illustrated in FIG. 8.

If the light exposure at an event when an image is captured by the imaging device 11 is determined to be insufficient, the display device 12 is controlled to decrease its refresh rate, and also the imaging device 11 is controlled to prolong its exposure time according to the low refresh rate as described above in the present embodiment. In this case, the scanning time required for the imaging device 11 to scan one frame image (a first scanning time) and the scanning time required for the display device 12 to scan the display panel 122 to display the image (the second scanning time) are constant without regard to the refresh rate or exposure time.

In the present embodiment, even if the frame rate is decreased to secure a sufficient amount of light exposure (i.e., even if exposure time is prolonged), the respective scanning times (i.e., the scanning timing for each line) of the imaging device 11 and the display device 12 are not changed (that is, the respective scanning times are always the same). Therefore, the present embodiment makes it possible to relieve the imaging display system 10 of the requirement of changing its operation clock etc., and to reduce the load imposed on the imaging display system 10 when adjusting the exposure time.

In the present embodiment, the scanning times of the imaging device 11 and the display device 12 are constant. Therefore, even if the refresh rate is decreased as the environment where an image is captured changes, it is still possible to even the image signal holding times between the upper portion and the lower portion in the display panel 122. Thus, according to the present embodiment, it is possible to suppress the deterioration in the quality of the image, which may be caused by the influence of leakage current.

In the present embodiment, the scanning times of the imaging device 11 and the display device 12 are constant without regard to the refresh rate or exposure time. Therefore, for example, if it is determined that the amount of light exposure is excessive, after the refresh rate is already decreased to secure a sufficient amount of light exposure, the refresh rate of the display device 12 is increased and the exposure time of the imaging device 11 is shortened according to the changed refresh rate.

Thus, in the present embodiment, even if the refresh rate is once decreased to secure a sufficient amount of light exposure (even if the exposure time is once prolonged), the refresh rate can be increased (exposure time can be shortened) without any unnecessary latency time as explained above with reference to FIG. 8. Therefore, the present embodiment achieves a smooth change in light exposure (change of refresh rates).

The present embodiment makes it possible to successively change the refresh rate based on the light exposure which may be insufficient or excessive. Therefore, according to the present embodiment, the refresh rate is increased in a bright place so as to display an image with less unsteadiness or blurriness, whereas the refresh rate is decreased in a dark place so as to display an image with less noise.

It should be noted that the embodiment discusses the case where the refresh rate is 240 Hz, 120 Hz, or 90 Hz, but that the refresh rate can be changed to any value other than any of these values.

In this case, the embodiment may be modified to change (determine) the refresh rate of the display device 12 and the exposure time of the imaging device 11 based on the light exposure required (sufficient) for the imaging device 11 to capture an image. Specifically, in the case where the refresh rate is changed in accordance with the shortage or excess of the light exposure, (the control module 134 in) the control device 13 calculates the exposure time for securing a sufficient amount of light exposure required to capture an image based on the brightness value of the image extracted from the image signal mentioned above or the value of illuminance around the imaging device 11 measured by the illuminance sensor. The control device 13 determines such a refresh rate that one frame period is almost the same in length as the calculated exposure time (at least one frame period is longer than the calculated exposure time). It should be noted that the exposure time for securing a required amount of light exposure may be calculated using, for example, a function or the like which is prepared in advance in the control device 13, or may be calculated by other techniques. With this structure, it is possible to operate the display device 12 at a refresh rate which secures a suitable exposure time (a suitable amount of light exposure).

If an image is captured in a very dark place (namely, the brightness value of an image is very low or the illuminance around the imaging device 11 is very low), there is apprehension that such a long time that may affect the display of an image may be calculated as an exposure time for securing a required amount of light exposure. In order to avoid this, the control device 13 may be modified to include a register which specifies the longest exposure time. Therefore, if a time longer than the longest exposure time provided in the register is calculated as an exposure time, the calculated result is discarded and the refresh rate is determined based on the longest exposure time provided in the register. This structure can avoid an occurrence of a situation in which the display device 12 operates at a refresh rate lower than required in order to secure a sufficient amount of light exposure. Therefore, any faults, including flicker (a flicker phenomenon) and deterioration of image quality, can be surely prevented.

In the above explanation, the exposure time is calculated based on the brightness value of an image or the value of illuminance around the imaging device 11. However, the embodiment may be modified to prepare in advance a table holding exposure times for securing light exposure sufficient for brightness or illuminance in the control device 13, and refer to the table to acquire an exposure time suitable for the brightness or illuminance.

This embodiment is described mainly in connection with the case where the exposure time (refresh rate) is adjusted based on the brightness of an image (a value indicative of the brightness of an image or the illuminance around the imaging device 11). However, if an object moving at high speed is captured on the condition that the exposure time is long (the refresh rate is low), a blurry image may be displayed.

Therefore, the embodiment may be modified to adjust the exposure time (refresh rate) according to the moving (traveling) speed of an object (hereafter referred to as a target object) which exists in a region where the imaging device 11 captures an image, for example. Specifically, the imaging display system may be constructed as follows. That is, if it is determined that a target object moves at a moving speed is not higher than a predetermined value (namely, the target object is moving at a low speed or is stationary), the display device 12 is controlled to operate at a low refresh rate and the imaging device 11 is controlled to operate at a long exposure time according to the refresh rate. On the other hand, if it is determined that a target object moves at a moving speed higher than a predetermined value (namely, the target object is moving at a high speed), the display device 12 is controlled to operate at a high refresh rate and the imaging device 11 is controlled to operate at a short exposure time according to the fresh rate. With this structure, it is possible to capture an image at a suitable exposure time according to the moving speed of the target object. Even if constructed as above, the scanning times of the imaging device 11 and the display device 12 are constant.

It is possible that the moving speed of a target object may be calculated based on the positional change (information) of the target object extracted from (the image signal of) the image captured by the imaging device 11 or may be measured using some other sensor. Moreover, if a target object is a person, the target object may be specified by a face authentication process etc., for example, applied to an image captured by the imaging device 11.

Moreover, in such a structure, the refresh rate of the display device 12 and the exposure time of the imaging device 11 may be changed to any respective values according to the moving speed of the target object.

The embodiment discussed above is based on the assumption that the imaging display system 10 is a low-delay system (i.e., a system in which a frame buffer is omitted, and the imaging device 11 and the display device 12 operate synchronously). However, the present embodiment may be applied to an imaging display system in which a frame buffer is not omitted (i.e., a system in which the imaging device 11 and the display device 12 do not operate synchronously). In this case, if the scanning time of the imaging device 11 is set to be constant regardless of the change of exposure time (the change of the refresh rate of the display device 12), the load imposed when adjusting the exposure time can be reduced.

The present embodiment can be applied to such an imaging display system that makes the scanning time of (each of) the imaging device 11 (and the display device 12) constant when adjusting its exposure time (changing its refresh rate). Therefore, the present embodiment may be applicable to such a configuration that adjusts exposure time in consideration of both the brightness of an image and the moving speed of a target object or in accordance with any other conditions. Furthermore, it may be modified to make the scanning time of (each of) the imaging device 11 (and the display device 12) constant (as explained with reference to FIG. 8), for example, only while a predetermined period (a period specified by the user).

This embodiment describes that the control device 13 is a device separate from the imaging device 11 or the display device 12. However, the control device 13 (or the processor thereof) may be built in the imaging device 11 (or the display device 12). Moreover, the embodiment describes that the control device 13 includes the acquisition module 131, the processing module 132, the determination module 133, and the control module 134 as functional modules. However, at least one of the modules 131-134 may be included in, for example, the imaging device 11 (or display device 12).

The embodiment describes that the display device 12 is a liquid crystal display. However, it suffices if the display device 12 is such a display device that can hold image signals (data pieces), for example, until the image is rewritten (that is, one frame period) and continue outputting (displaying) images, that is, for example, an organic electroluminescence display device (an OLED display).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Now, an invention related to the above embodiments is added below.

[C1]

An imaging display system in which an imaging device which scans an image and generates an image signal indicative of the image and a display device which scans a display panel according to the generated image signal and displays the image on the display panel, operate synchronously with each other, the imaging display system including:

a determining module which measures light exposure when the imaging device captures an image and determines whether the measured light exposure is insufficient; and a control module which controls the display device to decrease a refresh rate and the imaging device to prolong an exposure time according to the refresh rate, when determined that the light exposure is insufficient, wherein a first scanning time required for the imaging device to scan the image and a second scanning time required for the display device to scan the display panel are each constant regardless of the refresh rate and the exposure time.

[C2]

The imaging display system of [C1], wherein the determining module determines whether the light exposure is excessive after the imaging device is controlled to prolong the exposure time, and the control module controls the display device to increase the refresh rate and the imaging device to shorten the exposure time according to the refresh rate when determined that the light exposure is excessive.

[C3]

The imaging display system of [C1], wherein the control module changes the refresh rate of the display device and the exposure time of the imaging device based on the light exposure required for the imaging device to capture the image when determined that the measured light exposure is insufficient.

[C4]

An imaging display system in which an imaging device which scans an image and generates an image signal indicative of the image and a display device which scans a display panel according to the generated image signal and displays the image on the display panel, operate synchronously with each other, the imaging display system including:

a determining module which determines whether a moving speed of an object existing in a region where the imaging device captures images is higher than a predetermined value; and a control module which controls the display device to decrease a refresh rate and the imaging device to prolong an exposure time according to the refresh rate, when it is not determined that the moving speed is higher than the predetermined value, wherein a first scanning time required for the imaging device to scan the image and a second scanning time required for the display device to scan the display panel are each constant regardless of the refresh rate and the exposure time.

[C5]

The imaging display system of [C4], wherein the control module controls the display device to increase the refresh rate and the imaging device to shorten the exposure time according to the refresh rate when it is determined that the moving speed is higher than the predetermined value.

[C6]

The imaging display system of [C4], wherein the control module changes the refresh rate of the display device and the exposure time of the imaging device based on the light exposure according to the moving speed.

[C7]

An imaging device which scans an image and generates an image signal indicative of the image, the imaging device including:

a determining module which measures light exposure when the imaging device captures the image and determines whether the measured light exposure is insufficient; and a control module which controls the imaging device to prolong an exposure time when determined that the light exposure is insufficient, wherein a scanning time required for the imaging device to scan the image is constant regardless of the exposure time.

[C8]

The imaging device of [C7], wherein the determining module determines whether the light exposure is excessive after the imaging device is controlled to prolong the exposure time, and the control module controls the imaging device to shorten the exposure time when determined that the light exposure is excessive.

[C9]

The imaging device of [C7], wherein, when determined that the light exposure is insufficient, the control module changes the exposure time of the imaging device based on the light exposure required for the imaging device to capture the image.

[C10]

An imaging display method executed by a imaging display system in which an imaging device which scans an image and generates an image signal indicative of the image and a display device which scans a display panel according to the generated image signal and displays the image on the display panel, operate synchronously with each other, the imaging display method including:

a step of measuring light exposure when the imaging device captures an image and determining whether the measured light exposure is insufficient; and a step of controlling the display device to decrease a refresh rate and the imaging device to prolong an exposure time according to the refresh rate, when determined that the light exposure is insufficient, wherein a first scanning time required for the imaging device to scan the image and a second scanning time required for the display device to scan the display panel are each constant regardless of the refresh rate or the exposure time.

[C11]

The imaging display method of [C10], wherein the determining step includes a step of determining whether the light exposure is excessive after the imaging device is controlled to prolong the exposure time, and the controlling step includes a step of controlling the display device to increase the refresh rate and the imaging device to shorten the exposure time according to the refresh rate when determined that the light exposure is excessive.

[C12]

The imaging display method of [C10], wherein the controlling step includes a step of changing the refresh rate of the display device and the exposure time of the imaging device based on the light exposure required for the imaging device to capture the image when determined that the light exposure is insufficient.

What is claimed is:

1. An imaging display system in which an imaging device which scans an image and generates an image signal indicative of the image and a display device which scans a display panel according to the generated image signal and displays the image on the display panel, operate synchronously with each other,
the imaging display system comprising a control device connected to the imaging device and the display device, wherein
the control device is configured to:
measure light exposure when the imaging device captures the image and determine whether the measured light exposure is insufficient; and
control the display device to decrease a refresh rate and control the imaging device to prolong an exposure time according to the refresh rate, when determined that the light exposure is insufficient, and
a first scanning time required for the imaging device to scan the image and a second scanning time required for the display device to scan the display panel are each constant regardless of the refresh rate and the exposure time.

2. The imaging display system of claim 1, wherein
the control device is further configured to:
determine whether the light exposure is excessive after the imaging device is controlled to prolong the exposure time, and
control the display device to increase the refresh rate and control the imaging device to shorten the exposure time according to the refresh rate, when determined that the light exposure is excessive.

3. The imaging display system of claim 1, wherein the control device is further configured to change the refresh rate of the display device and the exposure time of the imaging device based on the light exposure required for the imaging device to capture the image when determined that the measured light exposure is insufficient.

4. The imaging display system of claim 3, wherein the control device is further configured to calculate the required light exposure based on a brightness value of the image extracted from the image signal.

5. The imaging display system of claim 3, wherein the control device is further configured to calculate a required light exposure based on illuminance around the imaging device measured by an illuminance sensor.

6. The imaging display system of claim 3, wherein the exposure time of the imaging device is shorter than a predetermined exposure time.

7. An imaging display system in which an imaging device which scans an image and generates an image signal indicative of the image and a display device which scans a display panel according to the generated image signal and displays the image on the display panel, operate synchronously with each other, the imaging display system comprising a control device connected to the imaging device and the display device, wherein
the control device is configured to:
determine whether a moving speed of an object in a region where the imaging device captures images is higher than a predetermined value; and
control the display device to decrease a refresh rate and control the imaging device to prolong an exposure time according to the refresh rate, when it is not determined that the moving speed is higher than a predetermined value, and
a first scanning time required for the imaging device to scan the image and a second scanning time required for the display device to scan the display panel are each constant regardless of the refresh rate and the exposure time.

8. The imaging display system of claim 7, wherein the control device is further configured to control the display device to increase the refresh rate and control the imaging device to shorten the exposure time according to the refresh rate, when it is determined that the moving speed is higher than the predetermined value.

9. The imaging display system of claim 7, wherein the control device is further configured to change the refresh rate of the display device and the exposure time of the imaging device based on the light exposure according to the moving speed.

10. The imaging display system of claim 7, wherein the control device is further configured to calculate the moving speed based on the positional change of the object extracted from the image signal.

11. The imaging display system of claim 10, wherein the control device is further configured to apply a face authentication process to the image captured by the imaging device in a case where the object is a person, to specify a position of the object.

12. An imaging display method executed by an imaging display system in which an imaging device which scans an image and generates an image signal indicative of the image and a display device which scans a display panel according to the generated image signal and displays the image on the display panel, operate synchronously with each other, the imaging display method comprising:
measuring light exposure when the imaging device captures an image and determining whether the measured light exposure is insufficient; and
controlling the display device to decrease a refresh rate and the imaging device to prolong an exposure time according to the refresh rate, when determined that the light exposure is insufficient, wherein
a first scanning time required for the imaging device to scan the image and a second scanning time required for the display device to scan the display panel are each constant regardless of the refresh rate and the exposure time.

13. The imaging display method of claim 12, wherein
the determining comprises determining whether the light exposure is excessive after the imaging device is controlled to prolong the exposure time, and
the controlling comprises controlling the display device to increase the refresh rate and the imaging device to shorten the exposure time according to the refresh rate, when determined that the light exposure is excessive.

14. The imaging display method of claim 12, wherein the controlling comprises changing the refresh rate of the display device and the exposure time of the imaging device based on the light exposure required for the imaging device to capture the image when determined that the measured light exposure is insufficient.

15. The imaging display method of claim 14, further comprising calculating a required light exposure based on a brightness value of the image extracted from the image signal.

16. The imaging display method of claim 14, further comprising calculating the required light exposure based on illuminance around the imaging device measured by an illuminance sensor.

17. The imaging display system of claim 14, wherein the exposure time of the imaging device is shorter than a predetermined exposure time.

* * * * *